(12) United States Patent
Kim et al.

(10) Patent No.: US 11,348,699 B2
(45) Date of Patent: May 31, 2022

(54) COOLING WATER SAFETY INJECTION DEVICE POWERED BY STEAM DISCHARGED DURING AN ACCIDENT AND NUCLEAR POWER PLANT HAVING THE SAME

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Youngin Kim, Daejeon (KR); Hyungi Yoon, Sejong (KR); Seungyeob Ryu, Daejeon (KR); Youngmin Bae, Daejeon (KR); Joohyung Moon, Daejeon (KR); Hunsik Han, Sejong (KR); Soojai Shin, Sejong (KR); Cheongbong Chang, Daejeon (KR); Seok Kim, Daejeon (KR); Junewoo Kee, Pohang-si (KR); Hyunjun Cho, Daejeon (KR); Minkyu Lee, Daejeon (KR); Bonghyun Cho, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 33 days.

(21) Appl. No.: 16/959,875

(22) PCT Filed: Aug. 31, 2018

(86) PCT No.: PCT/KR2018/010118
§ 371 (c)(1),
(2) Date: Jul. 2, 2020

(87) PCT Pub. No.: WO2019/135463
PCT Pub. Date: Jul. 11, 2019

(65) Prior Publication Data
US 2020/0335232 A1 Oct. 22, 2020

(30) Foreign Application Priority Data
Jan. 4, 2018 (KR) .................. 10-2018-0001370

(51) Int. Cl.
*G21C 15/18* (2006.01)
*G21C 9/012* (2006.01)
*G21C 15/243* (2006.01)

(52) U.S. Cl.
CPC .......... *G21C 15/185* (2019.01); *G21C 9/012* (2013.01); *G21C 15/243* (2013.01)

(58) Field of Classification Search
CPC .... G21C 15/18; G21C 15/182; G21C 15/185; G21C 15/24; G21C 15/243; G21C 15/00;
(Continued)

(56) References Cited

U.S. PATENT DOCUMENTS 5,180,543 A * 1/1993 Conway ................ G21C 15/18
376/282
2012/0243651 A1* 9/2012 Malloy .................... G21C 1/32
376/282
(Continued)

FOREIGN PATENT DOCUMENTS

CN 106297915 A * 1/2017 ............. Y02E 30/30
KR 20130131757 A 12/2013
(Continued)

OTHER PUBLICATIONS

International Search Report dated Feb. 27, 2019 issued in PCT/KR2018/010118.

*Primary Examiner* — Darlene M Ritchie
(74) *Attorney, Agent, or Firm* — Scully Scott Murphy and Presser

(57) ABSTRACT

A safety injection device includes, a cooling water storage section accommodating cooling water injected into the reac-
(Continued)

tor coolant system, a power producing section producing power with steam discharged from the reactor coolant system in case of an accident, a steam supply pipe transmitting steam discharged from the reactor coolant system to the power producing section, a steam discharge pipe discharging steam used to drive the power producing section and a safety injection line supplying cooling water accommodated in the cooling water storage section to the inside of the reactor coolant system. In addition, cooling water accommodated in the cooling water storage section is supplied to the inside of the reactor coolant system, based on the power produced by the power producing section, through a cooling water inlet pipe connecting the cooling water storage section and the power producing section.

19 Claims, 11 Drawing Sheets

(58) Field of Classification Search
CPC ... G21C 1/03; G21C 9/00; G21C 9/02; G21C 9/012; Y02E 30/30; Y02E 30/00; G21D 3/04; B65D 47/30

USPC .......................................... 376/282, 283, 299
See application file for complete search history.

(56) References Cited

U.S. PATENT DOCUMENTS

| | | | |
|---|---|---|---|
| 2012/0263268 A1 | 10/2012 | Kwon et al. | |
| 2013/0077730 A1* | 3/2013 | Kito | G21C 15/18 376/283 |
| 2013/0223581 A1* | 8/2013 | Katono | G21C 15/18 376/280 |
| 2014/0140467 A1* | 5/2014 | Fortino | G21C 15/25 376/395 |
| 2015/0117586 A1* | 4/2015 | Graham | G21D 3/06 376/283 |
| 2016/0247585 A1* | 8/2016 | Han | G21C 15/24 |

FOREIGN PATENT DOCUMENTS

| | | | | |
|---|---|---|---|---|
| KR | 101382256 B1 | 4/2014 | | |
| KR | 20160044621 A | 4/2016 | | |
| KR | 101644061 B1 | 7/2016 | | |
| WO | WO-2015080447 A1 * | 6/2015 | | G21C 1/322 |

* cited by examiner

[Fig. 1A]
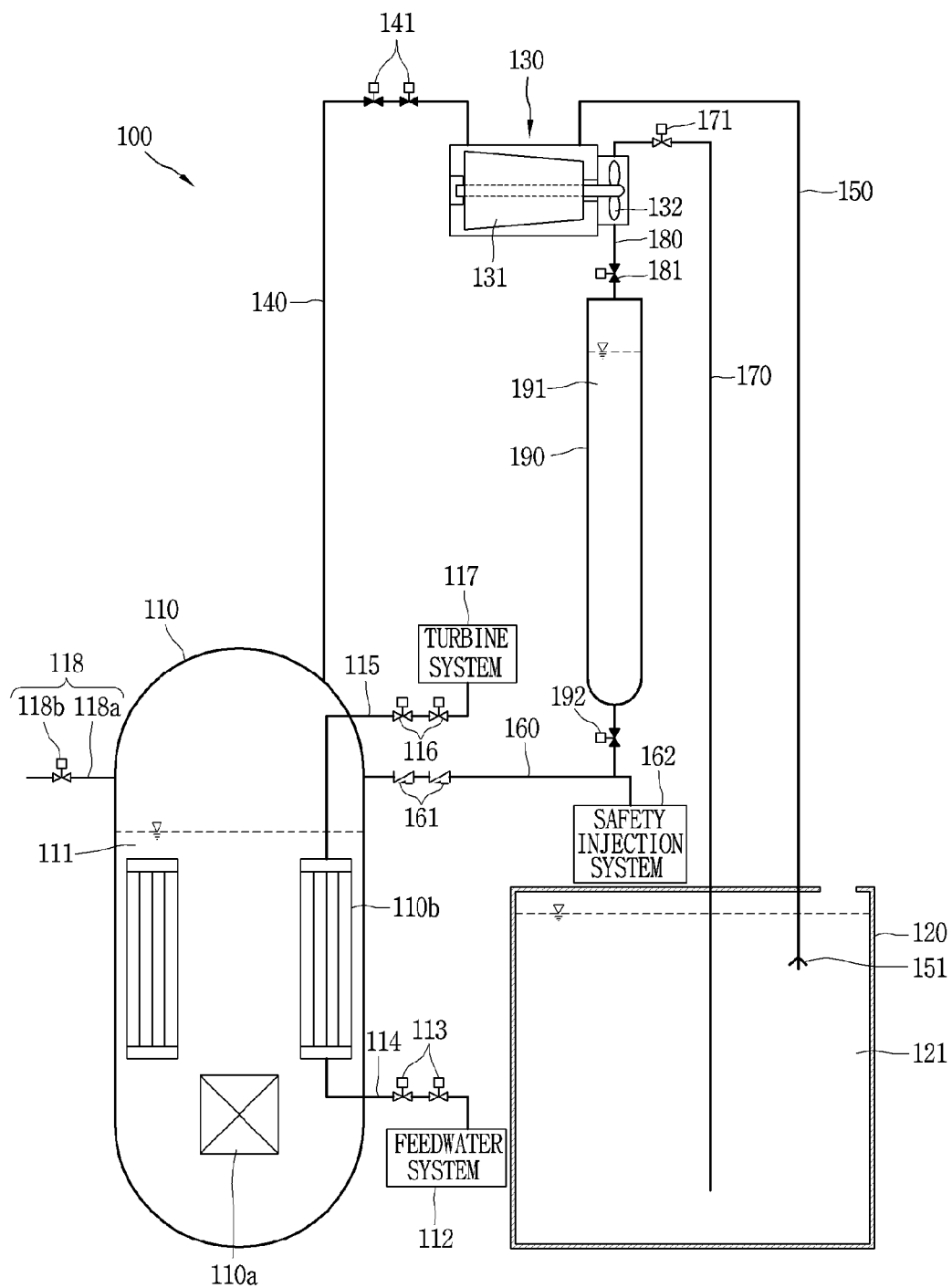

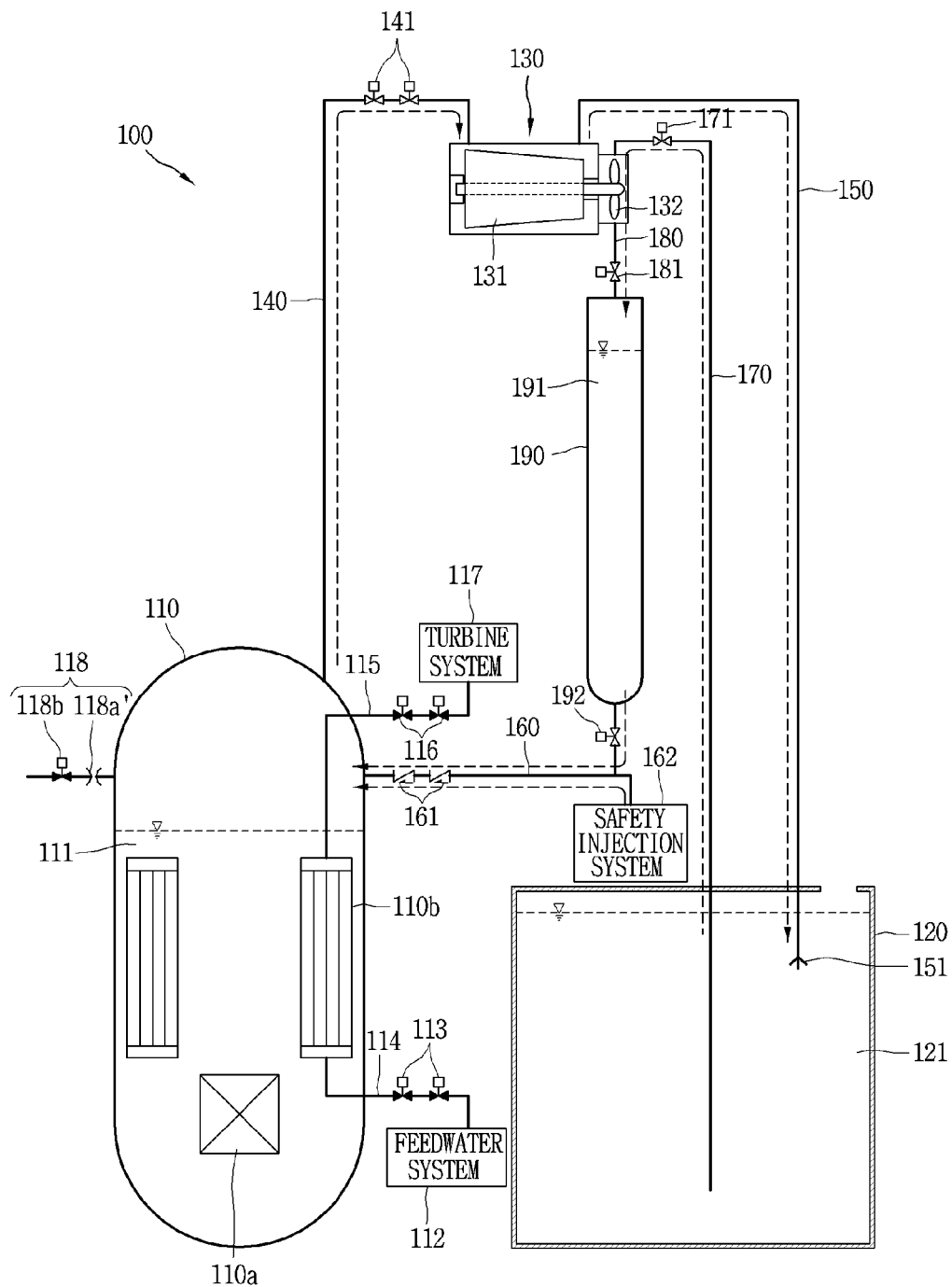
[Fig. 1B]

[Fig. 2A]
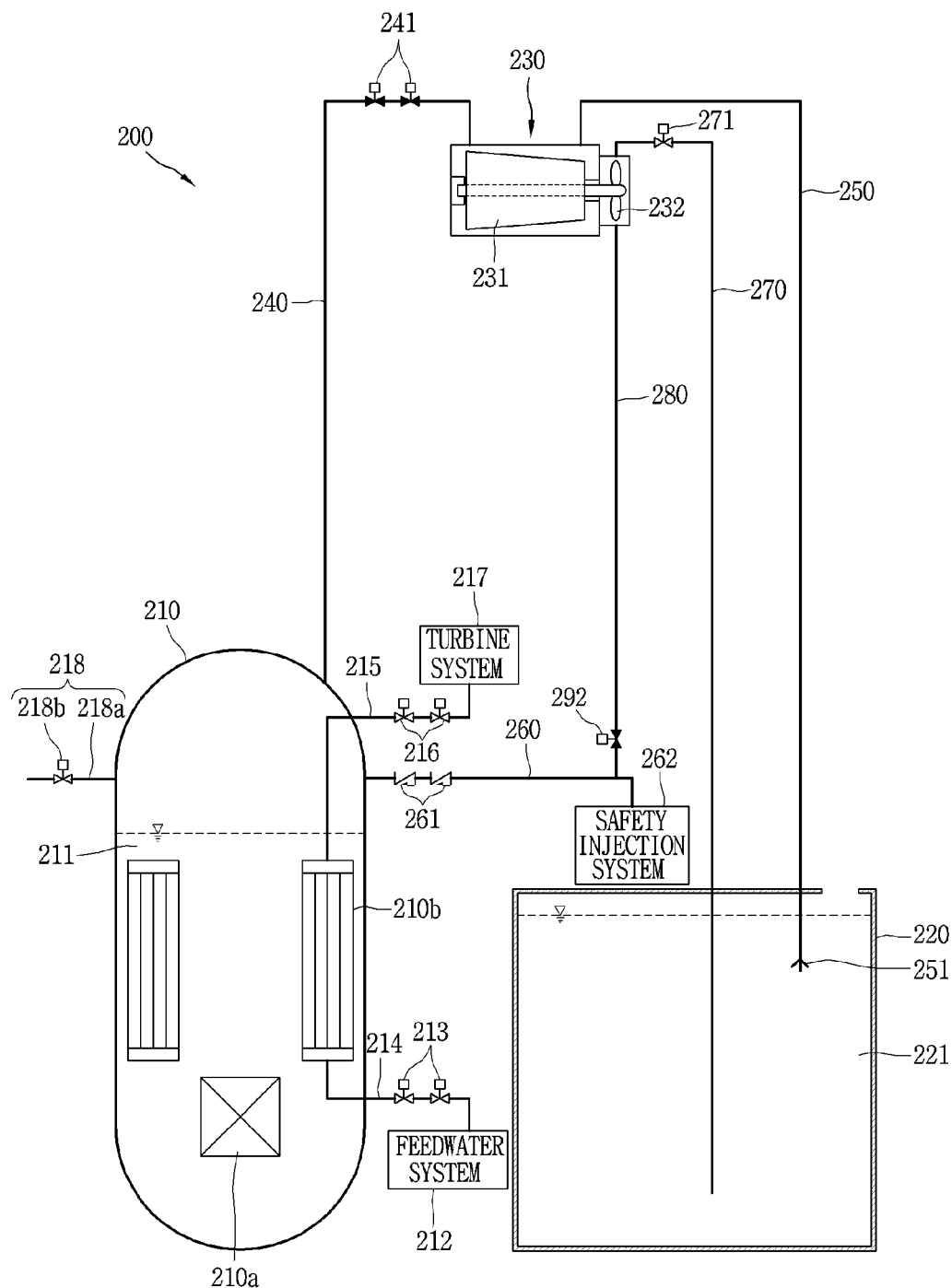

[Fig. 2B]
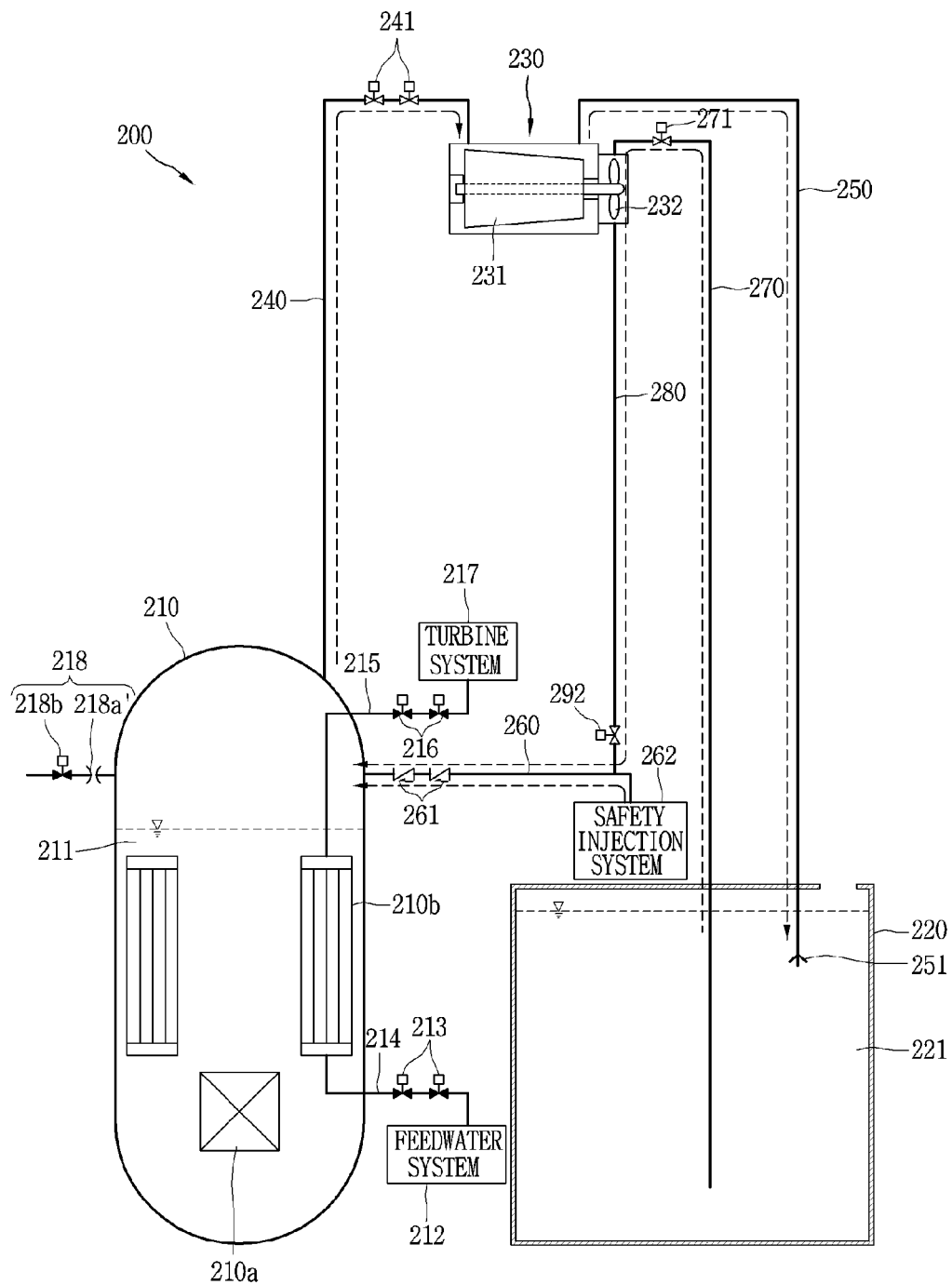

[Fig. 3A]
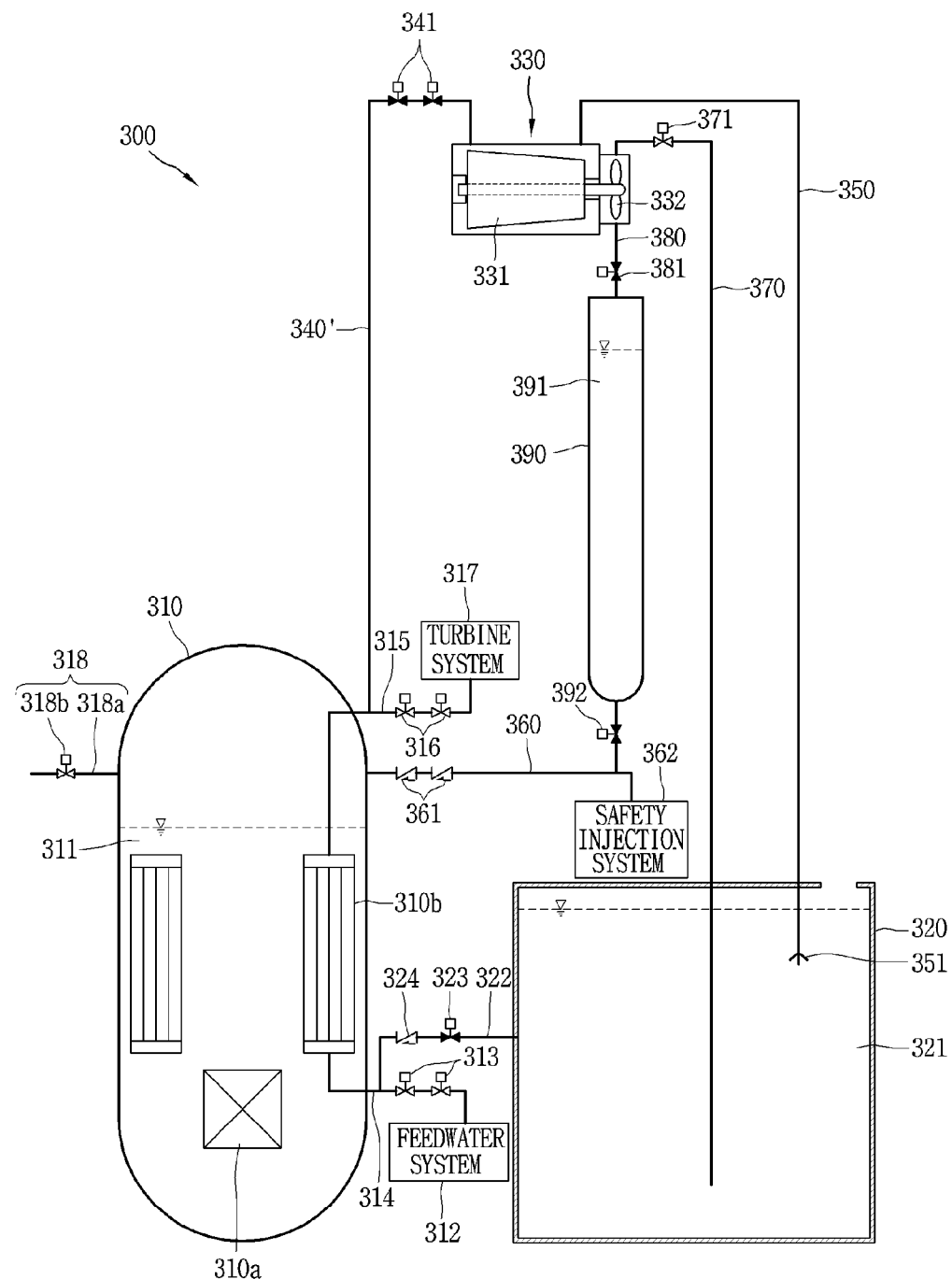

[Fig. 3B]
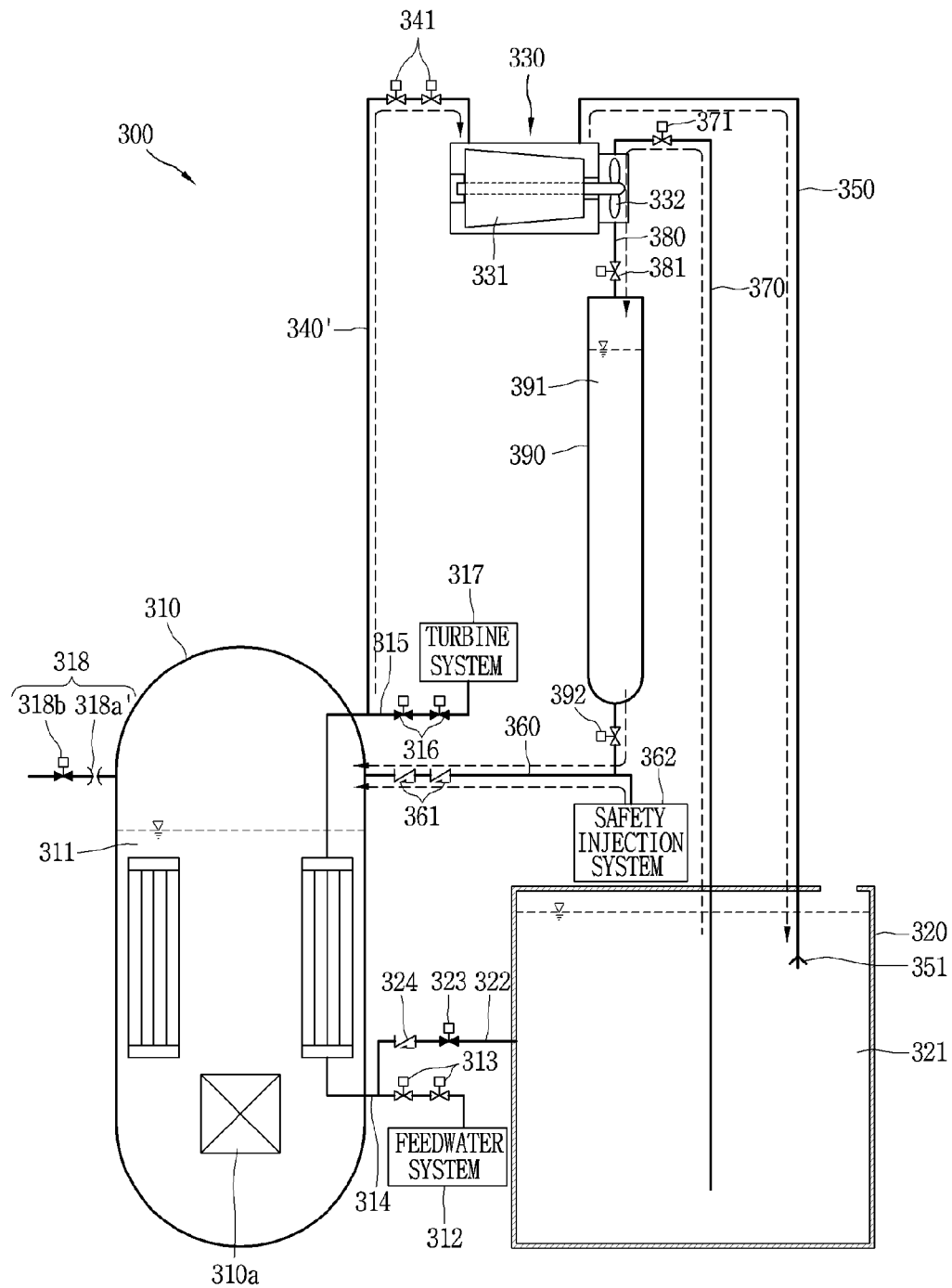

[Fig. 4A]
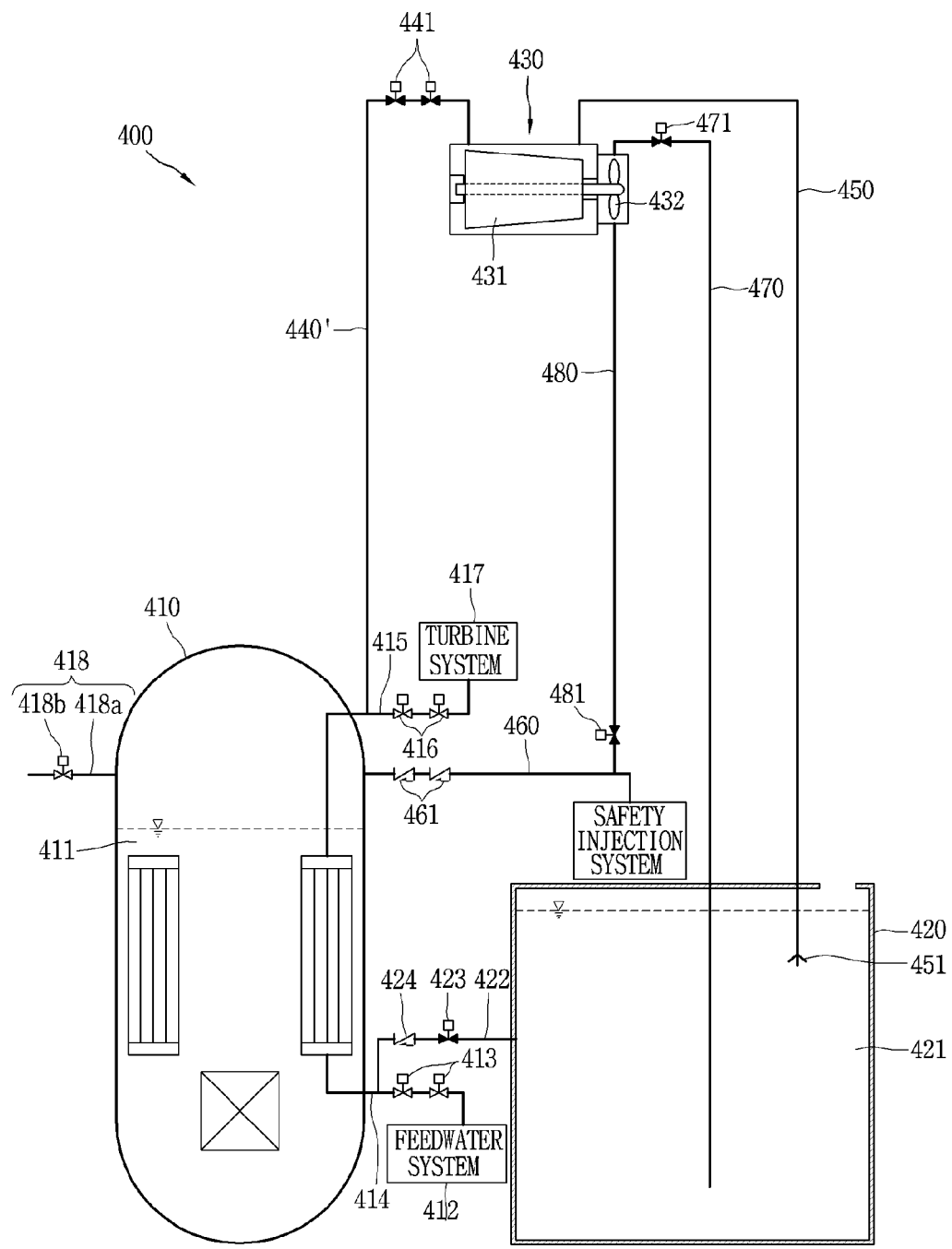

[Fig. 4B]
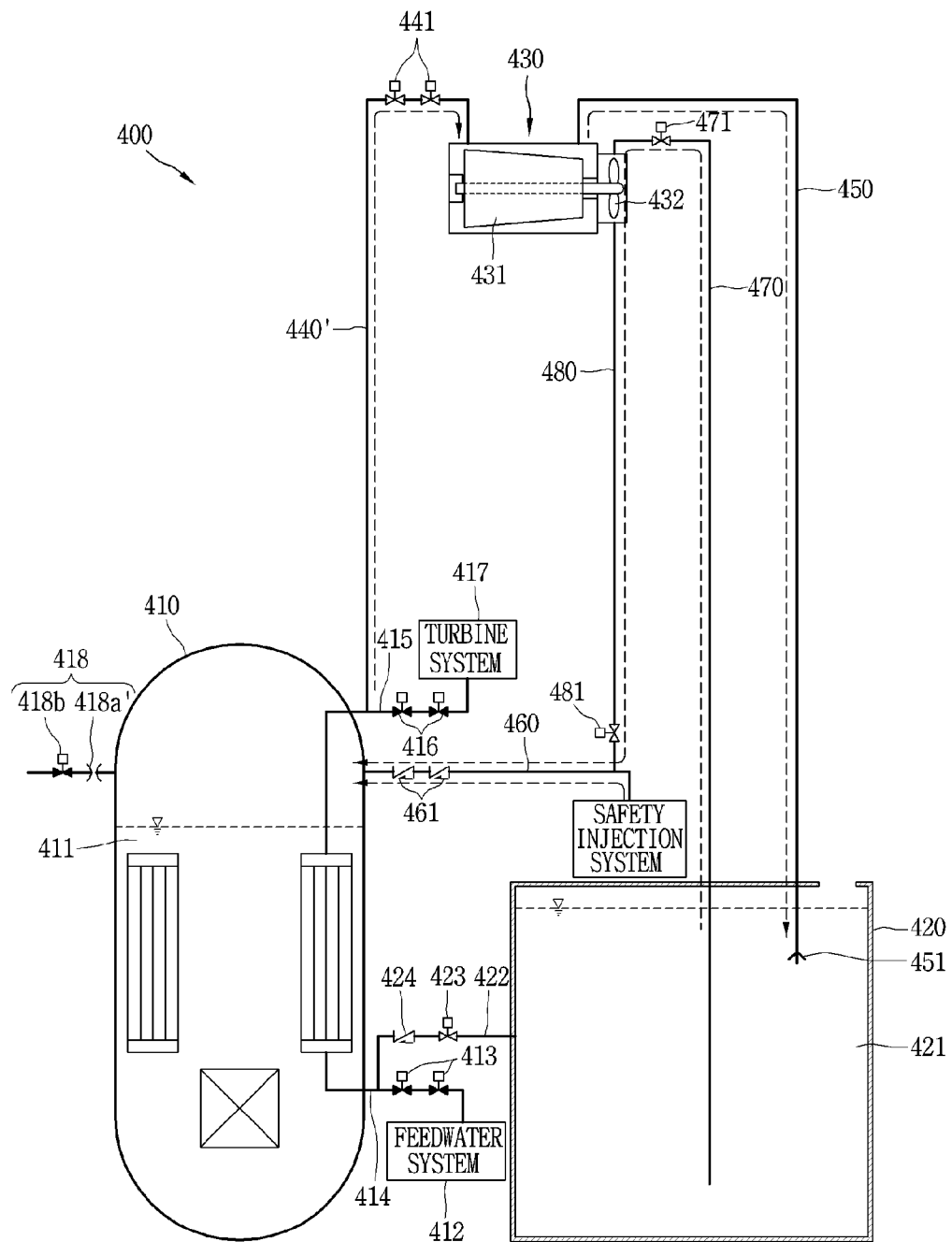

[Fig. 5A]
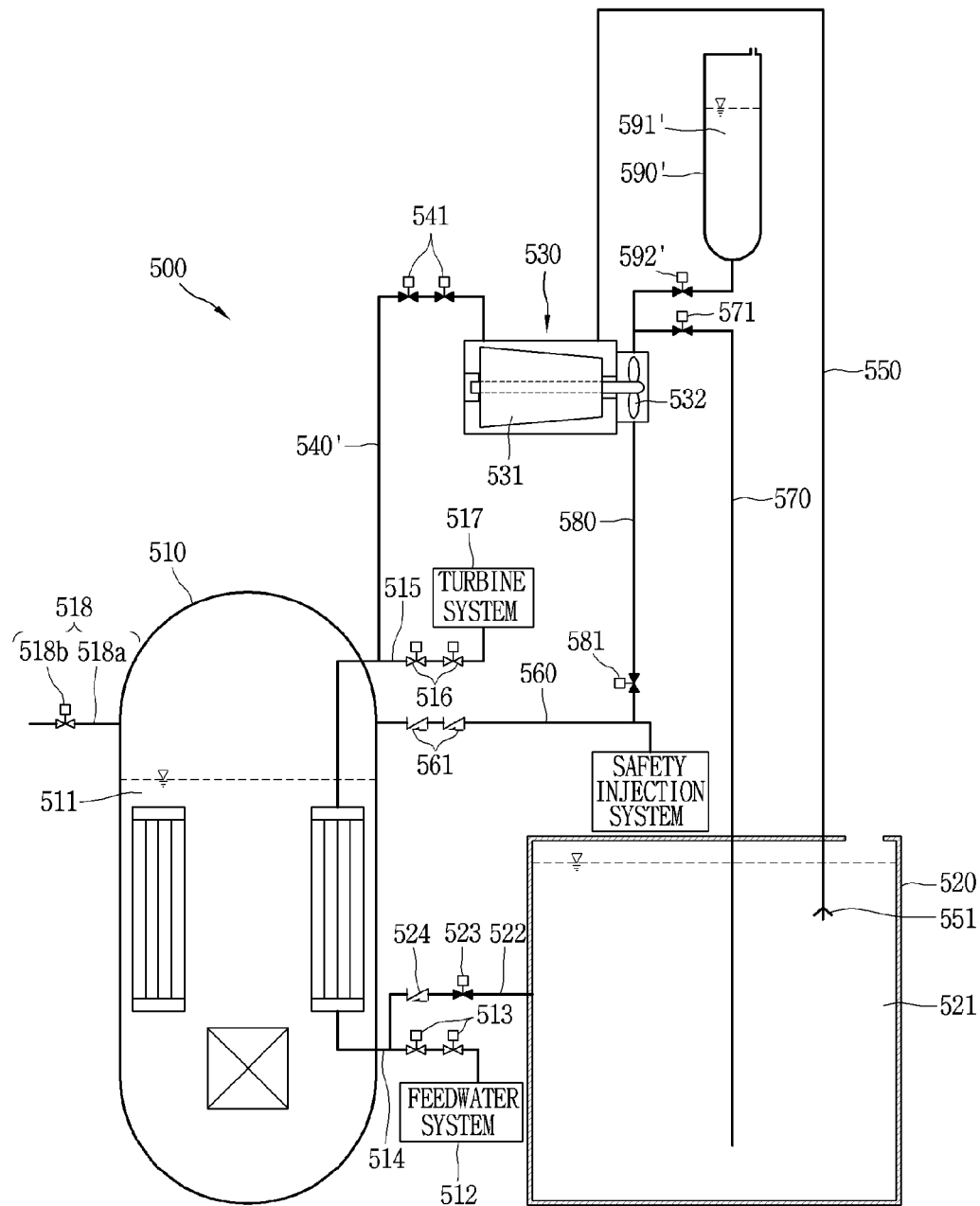

[Fig. 5B]
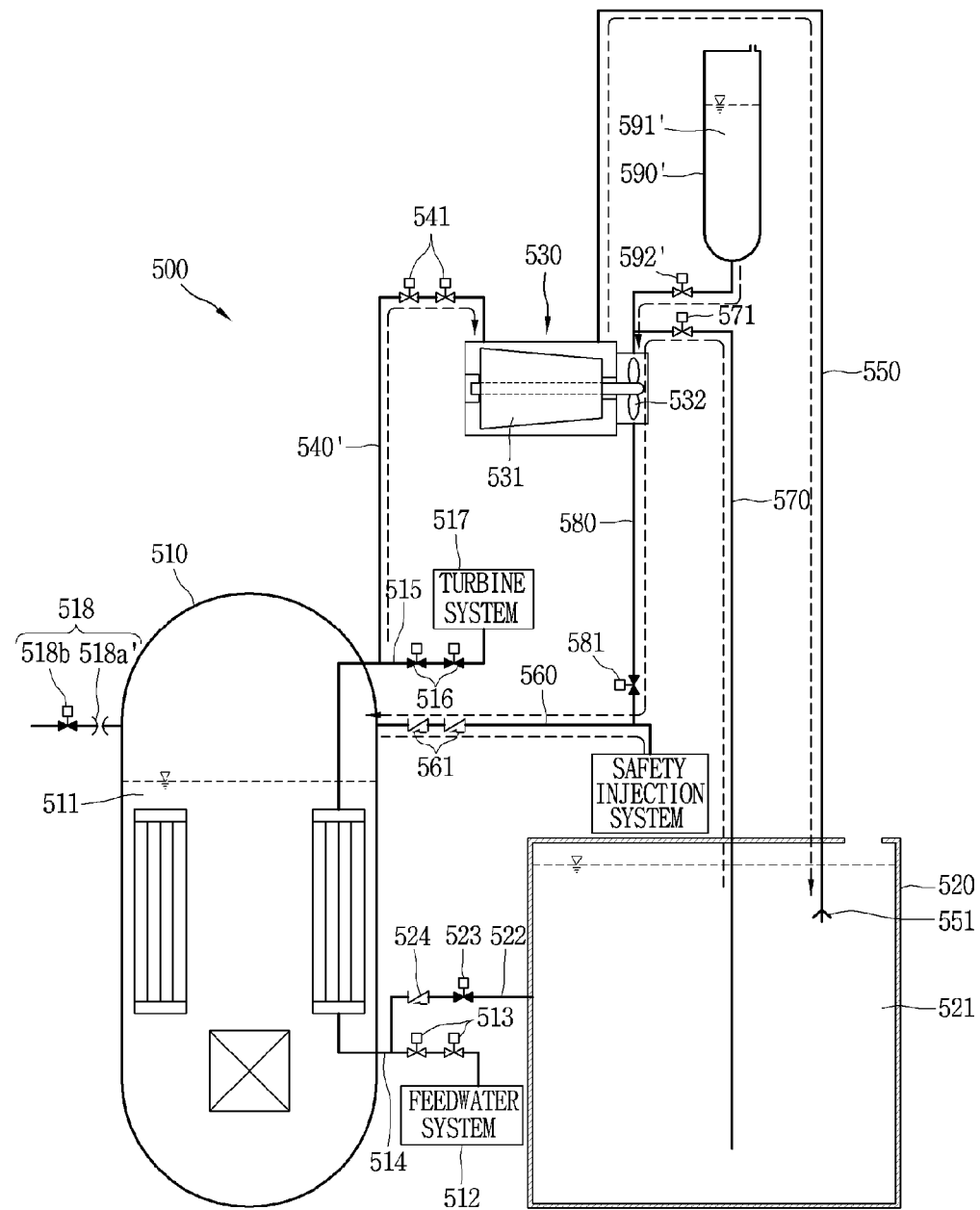

[Fig. 6A]
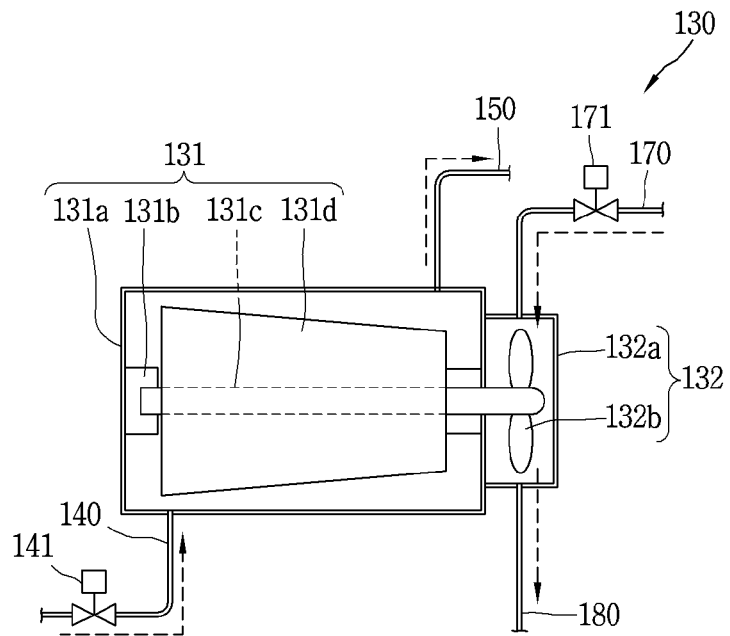
[Fig. 6B]
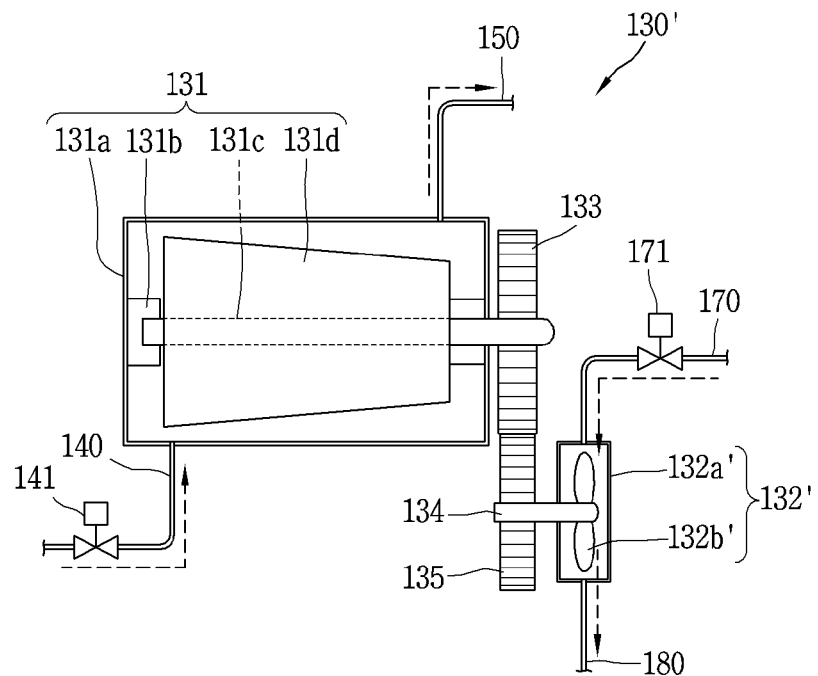

COOLING WATER SAFETY INJECTION DEVICE POWERED BY STEAM DISCHARGED DURING AN ACCIDENT AND NUCLEAR POWER PLANT HAVING THE SAME

CROSS-REFERENCE TO RELATED APPLICATION

This application is the National Stage filing under 35 U.S.C. 371 of International Application No. PCT/KR2018/010118, filed on Aug. 31, 2018, which claims the benefit of earlier filing date and right of priority to Korean Application No. 10-2018-0001370, filed on Jan. 4, 2018, the contents of which are all hereby incorporated by reference herein in their entirety.

BACKGROUND

1. Technical Field

The present disclosure relates to a safety injection device for securing stability of a nuclear power plant, and particularly, to a safety injection device for injecting safety injection water in the event of a nuclear accident.

2. Description of the Related Art

A nuclear reactor is divided into a loop type reactor (e.g., commercial reactor: Korea) in which major equipment (steam generator, pressurizer, pump, etc.) is installed outside a reactor vessel and an integral reactor (e.g., SMART reactor: Korea) in which major equipment is installed inside a reactor vessel depending on an installation position.

Also, a nuclear reactor is divided into an active reactor and a passive reactor depending on an implementation scheme of a safety system. An active reactor is a reactor which uses an active device such as a pump operated by electric power of an emergency generator, or the like, to drive a safety system. A passive reactor is a reactor which uses a passive device operated by passive power such as gravity or gas pressure to drive a safety system. In a passive reactor, a passive safety system is a system which safely maintains a reactor even only with natural force installed in the system without an operator action or AC power of a safety class such as a diesel generator for more than a time (72 hours) required in regulatory requirements in an accident, and after 72 hours, the safety system may receive help of the operator action or a non-safety system.

Producing thermal output from a reactor is similar to a boiler. Heat produced by nuclear fission in a core of a pressurized water reactor is transferred to a reactor coolant (water) and the reactor coolant is forcibly circulated by a reactor coolant pump and supplied to a primary flow path of a steam generator. The reactor coolant increases a temperature of feedwater supplied to the secondary flow path of the steam generator through non-contact heat transfer to produce steam, and the produced steam drives a turbine to produce electricity, and the reactor coolant is supplied again to the core and recirculates.

Meanwhile, even when the reactor core is stopped, residual heat is generated in the core for a considerable period of time, and thus, the residual heat must be removed to keep the core safely. The residual heat of the reactor core has a characteristic of decreasing with time after the reactor core is stopped.

In detail, a control rod is inserted to suppress reactivity of the reactor core in the event of an accident, and borated water may be injected to additionally suppress the reactivity. Also, in order to keep the core safe, a coolant must be appropriately supplied so that the core may not be exposed to the outside of a water level. The borated water (cooling water) injection function is performed by a safety injection system.

The safety injection system may supply safety injection water (borated water) to a reactor in various manners in case of a nuclear accident. In a conventional loop type pressurized light water reactor, which is commonly used internationally, a large pipe may be damaged to cause a large break loss of coolant accident (LBLOCA) that a large amount of reactor coolant is discharged. In case of a large break loss of coolant accident of the commercial loop type pressurized light water reactor, a nitrogen-pressurized safety injection tank (or accumulator) is used to rapidly supply safety injection water (borated water) to the reactor. In addition, a low pressure safety injection pump and a high pressure safety injection pump are used. In another example, in a passive loop type pressurized reactor such as AP600, AP1000, or the like, developed by Westinghouse USA, a core makeup tank (CMT) which injects the safety injection water (borated water) using a gravity water head after pressure between the reactor and the tank is balanced under a high pressure condition is used in addition to the nitrogen-pressurized safety injection tank, and a refueling cavity (or in-containment refueling water storage tank (IRWST)) in a containment injected by gravity after the reactor is depressurized is used.

Meanwhile, unlike the loop type reactor, the integral reactor is formed to include a steam generator, a pressurizer, and a reactor coolant pump inside a reactor vessel, so that a large pipe may be excluded. Therefore, a large break loss of coolant accident is excluded in the integral reactor, and since many reactor coolants are retained in the reactor vessel, even when the loss of coolant accident (pipe damage) occurs, a pressure and water level of the reactor are slowly reduced, as compared with the loop type reactor.

Therefore, SMART (Korea development) implements a safety injection system by applying the core makeup tank and pressure balance type safety injection tank. The core makeup tank is in standby in a state in which a pressure balance line is open and pressure between the reactor and the tank is balanced. The pressure balance type safety injection tank is designed to have pressure lower than the core makeup tank and the both tanks are configured to inject the safety injection water (borated water) using gravity water head after the pressure balance valve is opened and pressure between the reactor and the tank is balanced in the event of an accident. Low-enriched borated water (about 4000 ppm or more) is stored in the core makeup tank and the safety injection tank.

A passive nuclear power plant has characteristics of using gravity in case of an accident. However, when a large water tank such as an in-containment refueling water storage tank is installed in a position higher than a reactor vessel, a load applied to a containment building is increased due to the water tank, and since the in-containment refueling water storage tank is installed in space for maintenance, a work space inside the containment building is narrowed, degrading economical efficiency of the nuclear power plant due to an increase in size of the containment building to additionally secure an adequate maintenance space.

Therefore, the present invention provides a safety injection device capable of supplying a coolant stored in the in-containment refueling water storage tank capable of accommodating a large amount of coolant without a limitation in location where the in-containment refueling water storage tank, as a safety injection water to the inside of a nuclear reactor for a long time, in case of an accident and a nuclear power plant having the safety injection device.

SUMMARY

Therefore, an object of the present invention is to provide a safety injection device with improved safety, which is capable of continuously supply safety injection water to cool a core inside a reactor coolant system in the event of an accident in which a nuclear reactor coolant leaks from a nuclear power plant.

Another object of the present invention is to propose a safety injection device which may operate for a long time in the event of an accident in which a reactor coolant leaks from a nuclear power plant even when a passive safety injection system is installed in the nuclear power plant.

Another object of the present invention is to propose a nuclear power plant which may secure a maintenance space inside a containment building by efficiently constructing a space inside the containment building and which may improve economical efficiency of power plant construction by preventing an increase in size of a containment building.

To achieve these and other advantages and in accordance with the purpose of this specification, as embodied and broadly described herein, a safety injection device includes: a containment building; a reactor coolant system provided inside the containment building and accommodating a reactor coolant formed to carry heat energy generated according to fission of fuel; a cooling water storage section accommodating cooling water injected into the reactor coolant system; a power producing section producing power with steam discharged from the reactor coolant system in case of an accident; a steam supply pipe transmitting steam discharged from the reactor coolant system to the power producing section; a steam discharge pipe discharging steam drove the power producing section; and a safety injection line supplying cooling water accommodated in the cooling water storage section to the inside of the reactor coolant system. In addition, cooling water accommodated in the cooling water storage section is supplied to the inside of the reactor coolant system on the basis of driving power produced by the power producing section through a cooling water inlet pipe connecting the cooling water storage section and the power producing section, a cooling water discharge pipe connecting the power producing section and the safety injection line, and the safety injection line.

In an embodiment, an integral reactor including a steam generator, a pressurizer, and a reactor coolant pump may be provided inside the reactor coolant system.

In an embodiment, the cooling water storage section may be provided at a position lower than the reactor coolant system.

In an embodiment, the power producing section may include a turbine and a pump.

In an embodiment, the turbine and the pump may be driven by the same shaft.

In an embodiment, the turbine and the pump may be driven by different shafts, and the turbine may further include a power transmission device to transmit rotational power to the pump.

In an embodiment, the turbine may further include a magnetic unit to transmit rotational power to the pump.

In an embodiment, the turbine may be an axial flow type turbine, a diagonal flow type turbine, a centrifugal turbine, a rotary type turbine or a mixed type turbine.

In an embodiment, the pump may be an axial flow type pump, a diagonal flow type pump, a centrifugal pump, a rotary type pump or a mixed type pump.

In an embodiment, the power producing section includes a jet pump.

In an embodiment, the steam supply pipe may supply steam discharged from the reactor coolant system to the power producing section.

In an embodiment, the steam supply pipe may supply steam discharged from the steam generator inside the reactor coolant system to the power producing section.

In an embodiment, a connection pipe may be provided to supply cooling water accommodated in the cooling water storage section to the steam generator.

In an embodiment, steam discharged through the steam discharge pipe may discharge into cooling water accommodated in the cooling water storage section.

In an embodiment, a sparger may be further provided at the end of the steam discharge pipe.

In an embodiment, the safety injection device may further include: a safety injection section accommodating cooling water between the power producing section and the safety injection line.

In an embodiment, the safety injection section may receive cooling water from the cooling water storage section on the basis of driving power produced by the power producing section.

In an embodiment, the safety injection section may be a gas pressured-driven type tank or a gravity-driven type tank.

In an embodiment, the safety injection section may be opened in space inside the containment building.

In an embodiment, the safety injection section may further include a pressure balance line.

In an embodiment, the safety injection device may further include a makeup tank connected to the power producing section and supplementing cooling water.

In another aspect, a nuclear power plant including the safety injection device may be provided.

According to the safety injection device of the present invention, when an accident occurs in which a reactor coolant leaks from a nuclear power plant, cooling water stored in the cooling water storage section is continuously supplied as safety injection water to the reactor coolant system by a driving force generated by steam emitted from the reactor coolant system in the power producing section, and thus, safety of the nuclear power plant may be improved.

In addition, since the safety injection device according to the present invention further includes a makeup tank connected to the power producing section to supplement cooling water, the passive safety injection system may be operated for a long time when an accident occurs in which the reactor coolant leaks.

In addition, the cooling water storage section of the safety injection device according to the present invention is disposed at a position lower than the reactor coolant system to reduce a load applied to the containment building due to the cooling water storage section, and since the space inside the containment building is effectively constructed to secure a space for maintenance to prevent an increase in size of the containment building, economical efficiency of nuclear power plant may be improved.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a conceptual view of a safety injection device according to an embodiment of the present invention.

FIG. 1B is a conceptual view illustrating an operation of a safety injection device in the event of a loss of coolant accident according to an embodiment of the present invention.

FIG. 2A is a conceptual view of a safety injection device according to another embodiment of the present invention.

FIG. 2B is a conceptual view illustrating an operation of a safety injection device according to another embodiment of the present invention in the event of a loss of coolant accident.

FIG. 3A is a conceptual view of a safety injection device according to another embodiment of the present invention.

FIG. 3B is a conceptual view illustrating an operation of a safety injection device according to another embodiment of the present invention in the event of a loss of coolant accident.

FIG. 4A is a conceptual view of a safety injection device according to another embodiment of the present invention.

FIG. 4B is a conceptual view illustrating an operation of a safety injection device according to another embodiment of the present invention in the event of a loss of coolant accident.

FIG. 5A is a conceptual view of a safety injection device according to another embodiment of the present invention.

FIG. 5B is a conceptual view illustrating an operation of a safety injection device according to another embodiment of the present invention in the event of a loss of coolant accident.

FIGS. 6A and 6B are conceptual views of a power producing section of the present invention.

DETAILED DESCRIPTION OF THE EMBODIMENTS

Hereinafter, the embodiments of the present invention will be described with reference to the accompanying drawings, in which like numbers refer to like elements throughout although the embodiments are different, and a description of the like elements a first embodiment will be used for those of the different embodiment. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

As used herein, the singular forms "a", "an" and "the" are intended to include the plural forms as well, unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

FIG. 1A is a conceptual view of a safety injection device 100 according to an embodiment of the present invention.

Referring to FIG. 1A, the safety injection device 100 according to the present invention includes a containment building (not shown), a reactor coolant system 110, a cooling water storage section 120, a power producing section 130, a steam supply pipe 140, a steam discharge pipe 150, a safety injection line 160, a cooling water inlet pipe 170, and a cooling water discharge pipe 180.

The safety injection device 100 may be provided inside the containment building (not shown), and when an accident in which the reactor coolant 111 leaks from a nuclear power plant, the safety injection device 100 may continuously supply cooling water accommodated in the cooling water storage section 120 to the reactor coolant system 110 as safety injection water (cooling water) to improve the safety of the nuclear power plant.

The containment building (not shown) serves as a final barrier to prevent leakage of a radioactive material from the nuclear reactor to the external environment. The containment building may be a large container formed of reinforced concrete and designed with low pressure.

In the present invention, however, the containment building is not limited to the form of the containment building to which reinforced concrete is applied, and a containment vessel installed for the same purpose may replace the function of the containment building according to characteristics of a nuclear power plant.

As shown, an integral reactor major equipment such as a core 110a, a steam generator 110b, a pressurizer, and a reactor coolant pump are disposed inside the reactor coolant system 110 to configure an integral reactor.

The pressurizer (not shown) serves to pressurize the reactor coolant system 110 to an overpressure state within a saturation temperature/pressure and to control the pressure, especially in a pressurized water reactor. Specifically, the pressurizer prevents formation of steam inside the reactor coolant system 110 while the reactor coolant 111 circulates. Further, the reactor coolant pump (not shown) serves to forcibly circulate the reactor coolant 111 by pump power.

Inside the reactor coolant system 110, a core 110a for producing heat by nuclear fission is disposed. The reactor coolant 111 may receive heat generated by the nuclear fission of fuel generated in the core 110a and transfers the received heat to the steam generator 110b to be described later.

Meanwhile, the steam generator 110b forms a pressure boundary between a primary system and a secondary system, and primary system water flows through one flow path and secondary system water flows to the other flow path, transmitting heat. Thus, the reactor coolant 111 serving as the high-temperature primary system water is cooled and feedwater (low temperature, secondary system water) supplied from a feedwater system 112 through a valve 113 and a pipe 114 produces steam upon receiving heat, and the produced steam is supplied to a turbine system 117 through a valve 116 and a pipe 115 to produce electricity.

A chemical and volume control system 118 may be directly connected to the reactor coolant system 110 to manage water quality, a boric acid concentration, and the amount of cooling water of the reactor coolant 111 that removes heat generated in the core 110a and discharge the reactor coolant 111 to circulate the reactor coolant 111. Also, a valve 118b may be provided in a through pipe 118a.

Meanwhile, the cooling water storage section 120 may be a tank or a water tank capable of accommodating a large amount of cooling water (safe injection water, borated water). In particular, cooling water 121 of the cooling water storage section 120 may be injected into the reactor coolant system in case of an accident to ensure safety of the nuclear power plant.

The cooling water storage section 120 may be disposed anywhere inside the containment building. The cooling water storage section 120 may be disposed at a position higher than a position of the reactor coolant system 110 to supply cooling water to the reactor coolant system 110 by gravity when an accident occurs in which the reactor coolant 111 leaks.

However, in case where a large amount of cooling water is accommodated, if the cooling water storage section 120 is installed at a position higher than the reactor coolant system 110, a load applied to the containment building increases and a space for maintenance inside the containment building is reduced. Therefore, the cooling water storage section 120 is preferably disposed on a lower side of the containment building. Further, more preferably, the cooling water storage section 120 may be provided at a position lower than the reactor coolant system 110.

The cooling water storage section 120 may further include a cooling water return portion (not shown). The cooling water return portion may be configured to return cooling water discharged to the inside of the containment building to the cooling water storage section 120 in case of an accident. That is, the steam discharged in case of an accident may be condensed while exposed to the containment building and the heat exchanger which may be installed inside the containment building, and the condensed steam may be stored in the cooling water storage section 120 through the cooling water return portion. Accordingly, the cooling water return portion may be formed in a form having a passage between the containment building and the cooling water storage section.

In case the cooling water storage section 120 is disposed at the lower portion of the containment building so as not to be sufficient to supply cooling water that is accommodated inside the lower portion of the containment building to the reactor coolant system 110 by gravity in case of an accident, the power producing section 130 may be provided for safe injection of cooling water.

The power producing section 130 is formed to generate power by steam discharged from the reactor coolant system 110 in the event of a loss of coolant accident and supply the cooling water 121 stored in the cooling water storage section 120 to the reactor coolant system 110. That is, the cooling water 121 accommodated in the cooling water storage section 120 may be supplied to the inside of the reactor coolant system 110 based on a driving force generated by the power producing section 130.

In detail, in the event of a loss of coolant accident, a coolant is discharged to reduce the reactor water level and pressure and a control rod drive mechanism is inserted to stop the core 110a. However, since residual heat is generated in the core 110a, the reactor coolant 111 may be discharged as steam to drive the power producing section 130.

A steam supply pipe 140 connected to the reactor coolant system 110 may be provided to supply steam generated from sensible heat and residual heat of the nuclear reactor to the power producing section 130. The steam supply pipe 140 has a valve 141 which is opened in case of a loss of coolant accident. In addition, the steam which has driven the power producing section 130 may be discharged through the steam discharge pipe 150.

The end of the steam discharge pipe 150 may be immersed in the cooling water 121 accommodated in the cooling water storage section 120. Accordingly, the steam discharged from the steam discharge pipe 150 may be discharged through the cooling water 121 accommodated in the cooling water storage section 120. Further, the steam discharged from the discharge pipe 150 may be condensed and converted into cooling water to be recirculated for a long period of time. In addition, a sparger 151 is provided at the end of the steam discharge pipe 150, and steam condensation may be smoothly made as steam, hydrogen, non-condensable gas, and a radioactive material are spurted.

Meanwhile, the power producing section 130 may include a jet pump (not shown). In addition, the power producing section 130 may include a turbine 131 and a pump 132. That is, rotational power is produced from the turbine 131 by the steam supplied through the steam supply pipe 140. Further, the rotational power is transferred to the pump 132 connected to the turbine 131 by a shaft to drive the pump 132. The driving of the turbine 131 and the pump 132 will be described in detail later with reference to FIGS. 6A and 6B.

Referring back to the drawing, the cooling water 121 accommodated in the cooling water storage section 120 may pass through the pump 132 through the cooling water inlet pipe 170 so as to be supplied to the inside of the reactor coolant system 110 through the cooling water discharge pipe 180 and the safety injection line 160 by driving of the pump 132. In detail, the safety injection line 160 is connected to the reactor coolant system 110 and supplies the cooling water 121 accommodated in the cooling water storage section 120 to the inside of the reactor coolant system 110. Also, a check valve 161 may be provided on the safety injection line 160. Further, the safety injection line 160 may be connected to the safety injection system 162 to receive cooling water from the safety injection system 162 and supply the cooling water to the reactor coolant system 110 in case of an accident.

The cooling water inlet pipe 170 is formed to connect the cooling water storage section 120 and the power producing section 130. Further, a valve 171 may be disposed on the cooling water inlet pipe 170.

In addition, the cooling water discharge pipe 180 is formed to connect the power producing section 130 and the safety injection line 160. A valve 181 may be disposed on the cooling water discharge pipe 180 and a safety injection section 190 may be provided between the power producing section 130 and the safety injection line 160. A valve 192 may be further provided between the safety injection section 190 and the safety injection line 160.

In detail, the safety injection section 190 accommodates cooling water 191 therein to supply the cooling water to the reactor coolant system 110 in the event of a loss of coolant accident. The safety injection section 190 may receive the cooling water 121 of the cooling water storage section 120 to accommodate the cooling water and supply the cooling water to the reactor coolant system 110 based on a driving force produced by the power producing section 130.

The safety injection section 190 may be formed of a gas pressured-driven type tank or a gravity-driven type tank. In detail, the safety injection section 190 may be configured to supply the cooling water 191 accommodated in the safety injection section 190 into the reactor coolant system 110 in a pressurized manner. Meanwhile, in case where the safety injection section 190 is a gravity-driven type tank, the safety injection section 190 may be disposed so as to have an appropriate height difference from the reactor coolant system 110 to supply the cooling water 191 accommodated inside the safety injection section 190 to the inside of the reactor coolant system 110 by a gravity water head. Therefore, the passive safety injection system for supplying the cooling water using gravity may operate for a long time.

Meanwhile, the safety injection section 190 may be formed as a water tank that is open to a space inside of the containment building. In addition, the safety injection section 190 may further include a pressure balance line (not shown). In detail, the pressure balance line may connect an upper portion of the reactor coolant system 110 and an upper portion of the safety injection section 190, and during a normal operation of the nuclear power plant, the pressure balance line is closed by an isolation valve and is separated from the reactor coolant system 110, and thus, the pressure balance line may be designed to have a medium and low pressure lower than that of the reactor coolant system 110.

Referring back to the drawings, FIG. 1A may be a conceptual view of the safety injection device 100 during a normal operation. Since it is in the normal operation, the feedwater system 112, the turbine system 117, and the chemical and volume control system 118 are connected directly to the reactor coolant system 110 and operate normally. Thus, the steam generator 110b forms a pressure boundary between the primary system and the secondary system, and the primary system water flows through one flow path and the secondary system water flows through the other flow path, transmitting heat. That is, the reactor coolant 111 serving as the high-temperature primary system water is cooled and feedwater (low temperature, secondary system water) supplied from the feedwater system 112 through the valve 113 and the pipe 114 produces heat upon receiving heat, and the produced steam is supplied to the turbine system 117 through the valve 116 and the pipe 115 to produce electricity.

Meanwhile, the valve 141 disposed on the steam supply pipe 140 is closed and the power producing section 130 is not operated. In addition, the cooling water 121 or 191 accommodated in the safety injection section 190 and the cooling water storage section 120 is maintained without flowing into the reactor coolant system 110.

FIG. 1B is a conceptual view illustrating an operation of a safety injection device in the event of a loss of coolant accident according to an embodiment of the present invention.

Referring to FIG. 1B, the coolant may be lost to the through pipe 118a' broken due to damage to the chemical and volume control system 118 or other pipe. Accordingly, the valve 118b may be closed by a related signal. Also, the valves 113 and 116 connected to the feedwater system 112 and the turbine system 117 are also closed to stop the production of electricity.

Meanwhile, the reactor coolant 111 may leak to the broken through pipe 118a', a water level of the reactor coolant 111 inside the reactor coolant system 110 may be lowered, and internal pressure may be reduced. Thus, a safety system (not shown) is operated by a related signal. Further, a control rod drive mechanism (not shown) is inserted and the core 110a is stopped. In addition, the valves 141, 161, 171, 181, and 192 associated with the safety injection device are opened by a related signal. Thus, the safety injection device 100 is operated.

In detail, when the pressure inside the reactor coolant system 110 decreases, safety injection of cooling water may be started. Since residual heat is generated in the core 110a even after the core 110a is stopped, the reactor coolant 111 may be converted into steam continuously. Thus, the steam is introduced to the power producing section 130, and the turbine 131 and the pump 132 are operated. Specifically, the cooling water 121 accommodated in the cooling water storage section 120 may be supplied to the inside of the reactor coolant system 110 through the cooling water inlet pipe 170, the cooling water discharge pipe 180, and the safety injection line 160 on the basis of the driving force generated by the power producing section 130.

The cooling water 191 accommodated in the safety injection section 190 may also be supplied to the inside of the reactor coolant system 110 according to opening of the valve 192 using gravity. As the loss of coolant accident proceeds, the cooling water 121 of the cooling water storage section 120 may be replenished to the safety injection section 190 and the safety injection may be continuously performed. In addition, the safety injection system 162 may also operate to provide safe injection to the inside of the reactor coolant system 110 via the safety injection line 160.

Meanwhile, the steam that drives the power producing section 130 is discharged through the steam discharge pipe 150. The steam discharged from the discharge pipe 150 may be discharged through the cooling water 121 accommodated in the cooling water storage section 120. Further, the sparger 151 may be provided at the end of the steam discharge pipe 150 to smoothly perform steam condensation as steam, hydrogen, non-condensable gas, and radioactive material are spurted.

In other embodiments described below, the same or similar reference numerals are given to the same or similar components as those of the previous example, and the description is replaced with the first explanation.

FIG. 2A is a conceptual view of a safety injection device 200 according to another embodiment of the present invention, and FIG. 2B is a conceptual view illustrating an operation of the safety injection device 200 in case of a loss of coolant accident.

Referring to FIG. 2A, the safety injection device 200 may be configured to exclude the safety injection section 190 of the safety injection device 100 described above. Further, referring to FIG. 2B, valves 241, 261, 271 and 281 related to the safety injection device are opened by a related signal in case of a loss of coolant accident. Accordingly, when pressure inside the reactor coolant system 210 decreases, the operation of the safety injection device 200 is performed and safe injection of the cooling water may be started.

In detail, since residual heat is generated in the core 210a even after the core 210a is stopped, the reactor coolant 211 may be continuously converted into steam. Thus, the steam is introduced to the power producing section 230 and the turbine 231 and the pump 232 are operated. In detail, the cooling water 221 accommodated in the cooling water storage section 220 may be supplied to the inside of the reactor coolant system 210 through the cooling water inlet pipe 270, the cooling water discharge pipe 280, and the safety injection line 260 on the basis of driving force generated by the power producing section 230. In addition, the safety injection system 262 may also operate to provide safe injection into the inside of the reactor coolant system 210 via the safety injection line 260.

FIG. 3A is a conceptual view of a safety injection device 300 according to another embodiment of the present invention, and FIG. 3B is a conceptual view illustrating an operation of the safety injection device 300 in case of a loss of coolant accident.

Referring to FIG. 3A, a steam supply pipe 340' of the safety injection device 300 may be connected to a steam generator 310b inside a reactor coolant system 310 to supply the steam generated by residual heat to a power producing section 330. Here, the safety injection device 300 may include a connection pipe 322 to supply cooling water 321 stored in the cooling water storage section 320 to the steam generator 310b. In detail, a valve 323 and a check valve 324 may be provided on the connection pipe 322 so that cooling water 321 may be supplied to a steam generator 410b only in case of an accident.

Further, referring to FIG. 3B, valves 341, 361, 371, and 381 related to the safety injection device are opened by a related signal in the event of a loss of coolant accident. Accordingly, when pressure inside the reactor coolant system 310 is reduced, the operation of the safety injection device 300 is performed to start safety injection of the cooling water.

In detail, since residual heat is generated in the core 310a even after the core 310a is stopped, feedwater (low temperature, secondary system water) supplied from the feedwater system 312 of the steam generator 311b through the valve 313 and the pipe 314 is converted to steam upon receiving heat. Accordingly, the steam converted from the feedwater supplied to the feedwater system 312 flows to the power producing section 330 through the steam supply pipe 340' and the turbine 331 and the pump 332 operate.

In case of an accident, the steam generated from the steam generator 311b is supplied to the power producing section 330. Therefore, the valve 313 and the pipe 314 connected to the feedwater system 312 are opened to continuously supply cooling water in the steam generator 311b. Further, when the feedwater system 312, the valve 313 and the pipe 314 are closed according to an accident situation, the cooling water 321 stored in the cooling water storage section 320 may be supplied to the steam generator 310b as the connection pipe 322, the valve 323, and the check valve 324 are opened.

FIG. 4A is a conceptual view of a safety injection device 400 according to another embodiment of the present invention, and FIG. 4B is a conceptual view illustrating an operation of the safety injection device 400 in case of a loss of coolant accident.

Referring to FIG. 4A, the safety injection device 400 may be configured to exclude the safety injection line 390 of the safety injection device 300 described above. Further, referring to FIG. 4B, valves related to the safety injection device 441, 461, 471, and 481 are opened by a related signal in case of a loss of coolant accident. Accordingly, when pressure inside the reactor coolant system 410 is reduced, an operation of the safety injection device 400 is performed and safety injection of the cooling water may be started.

FIG. 5A is a conceptual view of a safety injection device 500 according to another embodiment of the present invention, and FIG. 5B is a conceptual view illustrating an operation of the safety injection device 500 in case of a loss of coolant accident.

Referring to FIG. 5A, the safety injection device 500 may further include a makeup tank 590' in the safety injection device 400 described above. In detail, the makeup tank 590' may accommodate priming water 591' for pumping cooling water 521 of a cooling water storage section 520 when a pump 532 operates. Accordingly, the makeup tank 590' may be installed at a position capable of supplying cooling water to the pump 532, and the makeup tank 590' may be formed of a gas pressured-driven type tank or a gravity-driven type tank.

Further, referring to FIG. 5B, valves 541, 561, 571, 581, and 592' related to the safety injection device are opened by a related signal in the event of a loss of coolant accident. Accordingly, when pressure inside a reactor coolant system 510 decreases, the operation of the safety injection device 500 is performed and safety injection of the cooling water may be started. In detail, when the pump 532 starts operating, priming water 591' of the makeup tank 590' is supplied and cooling water 521 of the cooling water storage section 520 may smoothly flow to the inside of the reactor coolant system 510. However, when a self-priming pump is applied, the makeup tank 590' may not be installed.

FIG. 6A is a conceptual view of a power producing section 130 according to an embodiment of the present invention.

Referring to FIG. 6A, the power producing section 130 may include a turbine 131 and a pump 132. The turbine 131 may generate rotational power using steam and may include a turbine casing 131a, a bearing 131b, a turbine shaft 131c, and a turbine blade 131d. In detail, the turbine casing 131a is connected to the steam supply pipe 140 and the steam discharge pipe 150 to supply and discharge steam. Further, the bearing 131b is provided to support the turbine shaft 131c, and the turbine shaft 131c is provided with the turbine blade 131d to generate rotational power when steam is supplied. The turbine 131 may also be provided with a magnetic unit (not shown) to transmit power to the pump 132.

Further, the turbine 131 may be formed of an axial flow type, a diagonal flow type, a centrifugal type, a rotary type turbine or a mixed type turbine. If the turbine 131 is capable of generating rotational power using steam, a driving type thereof is not limited.

Further, the turbine 131 and the pump 132 of the power producing section 130 may be connected to and driven by the same turbine shaft 131c. It is, the turbine 131 and the pump 132 are connected to the same turbine shaft 131c and rotate at the same RPM.

Meanwhile, the pump 132 may include a pump casing 132a and an impeller 132b. In detail, the pump may supply cooling water using rotational power. Accordingly, the pump casing 132a is connected to the cooling water inlet pipe 170 and the cooling water discharge pipe 180 connected to the cooling water storage section described above to supply cooling water. Also, the impeller 132b receives rotational power from the turbine shaft 131c to convert mechanical energy into fluid energy. That is, cooling water may be supplied from the cooling water inlet pipe 170 to the cooling water discharge pipe 180 according to driving of the pump 132.

Further, the pump 132 may be formed of an axial flow type, a diagonal flow type, a centrifugal type, a rotary type or a mixed type pump thereof. Further, a driving method of the pump 132 may be non-self-priming pump which requires priming water or a self-priming pump. The self-priming pump may be configured to supply water to a pump from a system in which cooling water is not filled in the pump and a related pipe. The self-priming pump includes a suction pipe. In order to operate the self-priming pump, the pump is operated by discharging air contained in the suction pipe to evacuate and lower pressure and sucking water to compensate for the lowered pressure. When the self-priming pump is applied, the pump is required to be disposed such that a height difference between a water surface and the pump is appropriate in consideration of an available effective suction head of the suction pipe.

The pump 132 is not limited in shape or driving method as long as it can receive rotational power from the turbine 131 and convert mechanical energy into fluid energy.

In other embodiments described below, the same or similar reference numerals are given to the same or similar components as those of the previous example, and the description is replaced with the first explanation.

FIG. 6B is a conceptual view of a power producing section 130' according to another embodiment of the present invention.

Referring to FIG. 6B, the power producing section 130' may include a turbine 131 and a pump 132'. In detail, a first rotary gear 133 and a second rotary gear 134 may be connected as power transmission devices to the turbine shaft 131c and power may be transmitted to the pump 132' through the pump shaft 135. That is, the turbine 131 and the pump 132' may be connected to each other by different shafts and operate. Further, the pump 132' may be adjusted to have an RPM different from that of the turbine shaft 131c, while power is being transmitted by the first rotary gear 133 and the second rotary gear 134, and have various RPMs, pressures and flow rates in driving. In addition, by the introduction of the power transmission devices, the pump 132' may be disposed at various positions without a limitation of space.

It will be apparent to those skilled in the art that the invention may be embodied in other specific forms without departing from the spirit or essential characteristics thereof.

Also, the detailed description should not be interpreted as being limited from all aspects, but should be considered as being illustrative. The scope of the present invention should be determined by reasonable analysis of the attached claims, and all changes within an equivalent range of the present invention fall within the scope of the present invention.

What is claimed is:

1. A safety injection device comprising:
   a containment building;
   a reactor coolant system provided inside the containment building and accommodating a reactor coolant formed to carry heat energy generated according to fission of fuel;
   a cooling water storage section accommodating cooling water injected into the reactor coolant system;
   a power producing section producing power with steam discharged from the reactor coolant system in case of an accident;
   a steam supply pipe transmitting steam discharged from the reactor coolant system to the power producing section;
   a steam discharge pipe discharging steam used to drive the power producing section; and
   a safety injection line supplying cooling water accommodated in the cooling water storage section to the inside of the reactor coolant system,
   wherein cooling water accommodated in the cooling water storage section is supplied to the inside of the reactor coolant system sequentially through a cooling water inlet pipe connecting the cooling water storage section and the power producing section, a cooling water discharge pipe connecting the power producing section and the safety injection line, and the safety injection line, on the basis of driving power produced by the power producing section,
   wherein the steam supply pipe supplies steam discharged from the steam generator of the reactor coolant system to the power producing section, and
   wherein a connection pipe is provided to supply cooling water accommodated in the cooling water storage section to the steam generator.

2. The safety injection device of claim 1, wherein an integral reactor including a steam generator, a pressurizer, and a reactor coolant pump is provided inside the reactor coolant system.

3. The safety injection device of claim 1, wherein the cooling water storage section is provided at a position lower than the reactor coolant system.

4. The safety injection device of claim 1, wherein the power producing section includes a turbine and a pump.

5. The safety injection device of claim 4, wherein the turbine and the pump are driven by the same shaft.

6. The safety injection device of claim 4, wherein the turbine and the pump are driven by different shafts, and the turbine may further include a power transmission device to transmit rotational power to the pump.

7. The safety injection device of claim 4, wherein the turbine further includes a magnetic unit to transmit rotational power to the pump.

8. The safety injection device of claim 4, wherein the turbine is an axial flow type turbine, a diagonal flow type turbine, a centrifugal turbine, a rotary type turbine or a mixed type turbine.

9. The safety injection device of claim 4, wherein the pump is an axial flow type pump, a diagonal flow type pump, a centrifugal pump, a rotary type pump or a mixed type pump.

10. The safety injection device of claim 1, wherein the power producing section includes a jet pump.

11. The safety injection device of claim 1, wherein steam discharged through the steam discharge pipe is discharged into cooling water accommodated in the cooling water storage section.

12. The safety injection device of claim 1, wherein a sparger is further provided at the end of the steam discharge pipe.

13. The safety injection device of claim 1, further comprising:
    a safety injection section accommodating cooling water between the power producing section and the safety injection line.

14. The safety injection device of claim 13, wherein the safety injection section receives cooling water from the cooling water storage section on the basis of driving power produced by the power producing section.

15. The safety injection device of claim 13, wherein the safety injection section is a gas pressure-driven type tank or a gravity-driven type tank.

16. The safety injection device of claim 13, wherein the safety injection section is opened in space inside the containment building.

17. The safety injection device of claim 13, wherein the safety injection section further includes a pressure balance line.

18. The safety injection device of claim 1, further comprising:
    a makeup tank connected to the power producing section and supplementing cooling water.

19. A nuclear power plant comprises a safety injection device, and wherein the safety injection device comprising:
    a containment building;

a reactor coolant system provided inside the containment building and accommodating a reactor coolant formed to carry heat energy generated according to fission of fuel;

a cooling water storage section accommodating cooling water injected into the reactor coolant system;

a power producing section producing power with steam discharged from the reactor coolant system in case of an accident;

a steam supply pipe transmitting steam discharged from the reactor coolant system to the power producing section;

a steam discharge pipe discharging steam used to drive the power producing section; and a safety injection line supplying cooling water accommodated in the cooling water storage section to the inside of the reactor coolant system, wherein cooling water accommodated in the cooling water storage section is supplied to the inside of the reactor coolant system sequentially through a cooling water inlet pipe connecting the cooling water storage section and the power producing section, a cooling water discharge pipe connecting the power producing section and the safety injection line, and the safety injection line, on the basis of driving power produced by the power producing section, wherein the steam supply pipe supplies steam discharged from the steam generator of the reactor coolant system to the power producing section, wherein a connection pipe is provided to supply cooling water accommodated in the cooling water storage section to the steam generator.

* * * * *